United States Patent
Bartek et al.

(10) Patent No.: US 9,333,494 B2
(45) Date of Patent: May 10, 2016

(54) BIOMASS CATALYTIC CRACKING CATALYST AND PROCESS OF PREPARING THE SAME

(75) Inventors: Robert Bartek, Centennial, CO (US); Michael Brady, Studio City, CA (US); Dennis Stamires, Dana Point, CA (US)

(73) Assignee: Inaeris Technologies, LLC, Pasadena, TX (US)

( * ) Notice: Subject to any disclaimer, the term of this patent is extended or adjusted under 35 U.S.C. 154(b) by 97 days.

(21) Appl. No.: 13/414,000

(22) Filed: Mar. 7, 2012

(65) Prior Publication Data

US 2013/0012376 A1 Jan. 10, 2013

Related U.S. Application Data

(60) Provisional application No. 61/464,858, filed on Mar. 10, 2011.

(51) Int. Cl.
| | | |
|---|---|---|
| *B01J 20/00* | (2006.01) | |
| *B01J 29/87* | (2006.01) | |
| *B01J 21/16* | (2006.01) | |
| *B01J 29/04* | (2006.01) | |
| *B01J 37/00* | (2006.01) | |
| *C10G 3/00* | (2006.01) | |
| *B01J 29/80* | (2006.01) | |

(52) U.S. Cl.
CPC ............. *B01J 29/048* (2013.01); *B01J 29/049* (2013.01); *B01J 29/80* (2013.01); *B01J 37/0045* (2013.01); *C10G 3/44* (2013.01); *Y02P 30/20* (2015.11)

(58) Field of Classification Search
None
See application file for complete search history.

(56) References Cited

U.S. PATENT DOCUMENTS

| | | | | |
|---|---|---|---|---|
| 2,495,751 A | * | 1/1950 | Mills et al. | 208/120.01 |
| 3,752,772 A | * | 8/1973 | Horzepa | 502/72 |
| 3,965,043 A | | 6/1976 | Stridde | |
| 4,238,364 A | * | 12/1980 | Shabtai | 502/65 |
| 4,409,092 A | | 10/1983 | Johnson et al. | |
| 4,601,997 A | | 7/1986 | Speronello | |

(Continued)

FOREIGN PATENT DOCUMENTS

| | | |
|---|---|---|
| EP | 1852466 | 11/2007 |
| EP | 1852490 | 11/2007 |

(Continued)

OTHER PUBLICATIONS

Lappas et al., "Design, Construction, and Operation of a Transported Fluid Bed Process Development Unit for Biomass Fast Pyrolysis: Effect of Pyrolysis Temperature," Ind. Eng. Chem. Res., 47: 742-747 (2000).

(Continued)

*Primary Examiner* — Melvin C Mayes
*Assistant Examiner* — Michael Forrest
(74) *Attorney, Agent, or Firm* — Jones & Smith, LLP

(57) ABSTRACT

A process for producing catalyst for biomass catalytic cracking is disclosed herein. The process includes modifying a phyllosilicate to produce a modified phyllosilicate having an improved yield of a pyrolysis reaction. The modification of the phyllosilicate includes leaching the clay with an acid or basic solution to form a leached clay preparation, calcining the leached clay and contacting the treated clay with a suspension comprising metal ions for ion-exchange. The modified clay catalyst can then be mixed with inorganic materials such as zeolites and dried to form fluidizable microspheres.

20 Claims, 2 Drawing Sheets

| Example No. | Description | % Kaolin | % Binder | %MO(1) | %MO(2) | MO(1)/MO(2) mole ratio |
|---|---|---|---|---|---|---|
| 1 | MgO/Al2O3 | 75.0% | 5.0% SiO2 (from sodium silicate) | 15% MgO | 5.0% Al2O3 (from Catapal) | 7.5 |
| 2 | ZnO/Al2O3 | 75.0% | 5.0% SiO2 (from sodium silicate) | 17.1% ZnO | 2.9% Al2O3 (from Catapal) | 7.5 |
| 3 | ZnO/Al2O3 | 75.0% | 5.0% SiO2 (from sodium silicate) | 12.3% ZnO | 7.7% Al2O3 (from Catapal) | 2.0 |
| 4 | ZnO | 75.0% | 5.0% SiO2 (from sodium silicate) | 20% ZnO | | --- |
| 5 | CaO | 75.0% | 5.0% SiO2 (from sodium silicate) | 20.0% CaO (using CaCO3) | | --- |
| 6 | CaO/Al2O3 | 75.0% | 5.0% SiO2 (from sodium silicate) | 16.1% CaO (using CaCO3) | 3.9% Al2O3 (from Catapal) | 7.5 |

(56) References Cited

U.S. PATENT DOCUMENTS

| | | | |
|---|---|---|---|
| 4,843,052 A * | 6/1989 | Lussier | 502/68 |
| 5,288,739 A * | 2/1994 | Demmel | 502/63 |
| 5,536,852 A | 7/1996 | Matsui et al. | |
| 5,545,599 A | 8/1996 | Pickering et al. | |
| 6,995,108 B1 | 2/2006 | Flessner | |
| 7,035,285 B2 | 4/2006 | Holloway et al. | |
| 2004/0110629 A1* | 6/2004 | Stamires et al. | 502/60 |
| 2009/0090046 A1 | 4/2009 | O'Connor et al. | |
| 2010/0105970 A1 | 4/2010 | Yanik et al. | |

FOREIGN PATENT DOCUMENTS

| | | |
|---|---|---|
| WO | WO 01/34295 | 5/2001 |
| WO | WO 2007/128799 | 11/2007 |
| WO | WO 2010/124069 | 10/2010 |

OTHER PUBLICATIONS

McKendry, P., "Energy Production From Biomass (Part 1): Overview of Biomass," Bioresource Technology, 83(1):37-46 (2002).

Samolada et al., "Catalyst Evaluation for Catalytic Biomass Pyrolysis," Energy & Fuels. 14: 1161-1167 (2000).

Wyman et al, "Coordinated Development of Leading Biomass Pretreatment Technologies," Bioresource Technology, 96:1959-1966, (2005).

International Search Report in International Application PCT/US2012/028031 mailed Jun. 25, 2012.

* cited by examiner

Figure 1

| Example No. | Description | % Kaolin | % Binder | %MO(1) | %MO(2) | MO(1)/MO(2) mole ratio |
|---|---|---|---|---|---|---|
| 1 | MgO/Al2O3 | 75.0% | 5.0% SiO2 (from sodium silicate) | 15% MgO | 5.0% Al2O3 (from Catapal) | 7.5 |
| 2 | ZnO/Al2O3 | 75.0% | 5.0% SiO2 (from sodium silicate) | 17.1% ZnO | 2.9% Al2O3 (from Catapal) | 7.5 |
| 3 | ZnO/Al2O3 | 75.0% | 5.0% SiO2 (from sodium silicate) | 12.3% ZnO | 7.7% Al2O3 (from Catapal) | 2.0 |
| 4 | ZnO | 75.0% | 5.0% SiO2 (from sodium silicate) | 20% ZnO | | --- |
| 5 | CaO | 75.0% | 5.0% SiO2 (from sodium silicate) | 20.0% CaO (using CaCO3) | | --- |
| 6 | CaO/Al2O3 | 75.0% | 5.0% SiO2 (from sodium silicate) | 16.1% CaO (using CaCO3) | 3.9% Al2O3 (from Catapal) | 7.5 |

…

BIOMASS CATALYTIC CRACKING CATALYST AND PROCESS OF PREPARING THE SAME

RELATED APPLICATIONS

This application claims the benefit of and priority to U.S. Provisional Application No. 61/464,858, filed Mar. 10, 2011, the content of which is hereby incorporated by reference in its entirety.

FIELD OF THE INVENTION

The invention relates to catalysts for use in catalytic process and more particularly to catalysts for use in a catalytic pyrolysis process or gasification of solid biomass material.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gasses such as hydrogen, which increases capital and operating costs), require expensive catalysts, suffer low conversion efficiency (e.g., incomplete conversion or inability to convert lignocellulosic and hemi-cellulosic material), and/or suffer poor product selectivity.

To date, a need remains for novel and improved processes for the conversion of solid biomass materials to produce fuels and specialty chemicals.

SUMMARY OF THE INVENTION

Aspects of the invention relate to a biomass catalytic cracking catalyst produced by the steps comprising (a) modifying a phyllosilicate to produce a modified phyllosilicate having an improved yield of a pyrolysis reaction, (b) mixing the modified phyllosilicate with inorganic materials; and (c) shaping the mixture into fluidizable microspheres.

In some embodiments, the step of modifying comprises (i) leaching a phyllosilicate to form a leached phyllosilicate preparation, (ii) calcining the leached phyllosilicate preparation to form a treated phyllosilicate and (iii) contacting the treated phyllosilicate with a suspension comprising metal ions to form a modified phyllosilicate. In some embodiments, the leaching of the phyllosilicate in step (i) includes treating the phyllosilicate with an acid to remove at least part of its alumina content thereby forming the acid leached phyllosilicate preparation. Phyllosilicate can be treated with an acid selected from the group consisting of nitric acid, hydrochloric acid, sulphuric acid, acetic acid, oxalic acid and formic acid. In other embodiments, the leaching of the phyllosilicate in step (i) includes treating the phyllosilicate with a base to remove at least part of its silica content thereby forming the base leached phyllosilicate preparation. Phyllosilicates can be selected from the group of smectites, bentonites, montmorillonite, beidellite, kaolinite and mixtures thereof. The smectite can be a non-swelling smectite.

In some embodiments, the step of calcining comprises heating the phyllosilicate at a temperature between about 200° C. and about 1000° C. The catalyst can then be rehydrated prior to contact with the suspension comprising metal ions.

In some embodiments, the treated phyllosilicates are contacted with a solution of metal ions wherein the metal ions are trivalent cations, divalent cations and/or monovalent cations. The divalent cations are selected from the group of Mg, Ca, Zn, Ba, Mn, Co, Mo, Ni, Cu and Sr and combinations thereof. The trivalent cations are selected from the group of Al, Ga, Bi, Fe, Cr, Co, Sc, La, Ce and combinations thereof. The monovalent cations are selected from the group of Na, K and combinations thereof.

In some embodiments, the treated phyllosilicates (leached and/or ion-exchanged) are mixed with inorganic materials that are selected from the group consisting of zeolites, metals, metal salts, metal oxides, hydroxides, hydroxyl carbonates, phosphates, synthetic clays, equilibrium cracking catalysts, fly ash, and cement flint. In some embodiments, the treated phyllosilicates are mixed with zeolite to form a phyllosilicate-zeolite catalyst. In some embodiments, the zeolite is ion-exchanged with different metal ions, ammonium ions, or with one or two different Rare Earth ions.

In some embodiments, the resulting catalyst is a mixed metal oxide or spinel. The resulting phyllosilicate preparation is spray dried to form microsphere particles suitable for biomass catalytic cracking. In some embodiments, the microspheres are prepared in the presence of binders such as sodium silicate, silica, silica-alumina, alumina, or phosphate. In some embodiments, the binder comprises phosphate.

In some embodiments, the phyllosilicate is kaolinite and is delaminated before being modified by ion exchange or leached.

In some embodiments, the catalyst has a reduced coke yield and/or a reduced oxygenated product yield when used in biomass pyrolysis. Preferably, the catalyst has an improved bio-oil yield when used in biomass pyrolysis.

BRIEF DESCRIPTION OF THE DRAWINGS

FIG. 1 illustrates the composition of various clay catalysts.

DETAILED DESCRIPTION OF THE INVENTION

Figure 2:
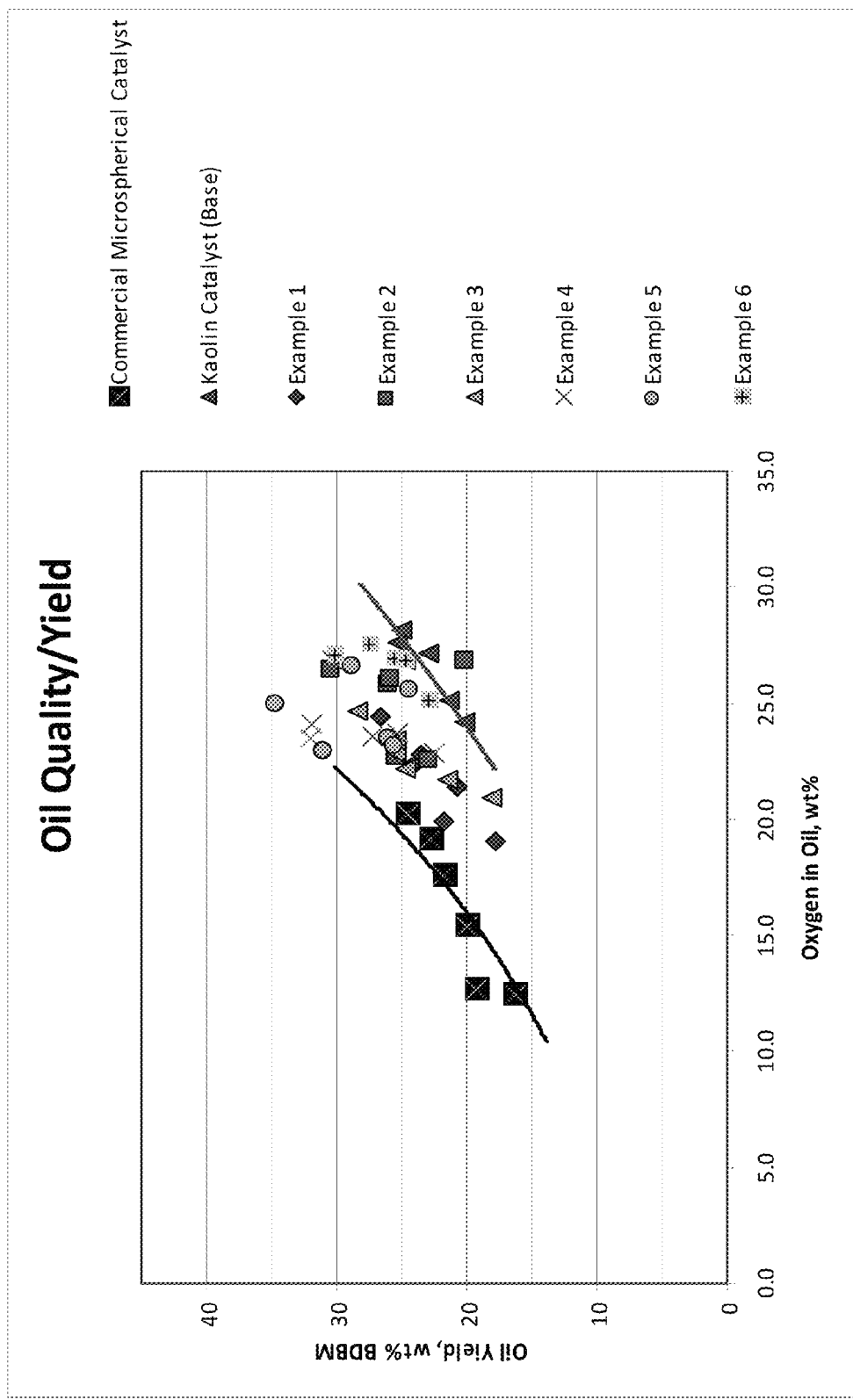
FIG. 2 depicts the oil quality (as oxygen in oil percent) and yield of various modified clay catalysts.

Aspects of the invention relate to methods, apparatus, kits and compositions for converting solid biomass into fuels and/or specialty chemicals. Suitable biomasses, or biomass materials, can include any biological material derived from living, or previously living, organisms. More particularly, non-limiting examples of biomasses suitable for use in the process described herein can include inedible materials, which do not compete with the food supply as well as materials that can be easily grown, or materials that are otherwise readily available, such as: grasses (including, for example, switch grass), saw dust, wood chips, wood bark, twigs, straw, corn stover, cotton linters, bagasse, and the like. In various embodiments, biomasses include materials of photosynthetic origin (e.g., plants), having such as, for example, materials made predominately of cellulose, hemicellulose, or lignin.

Some aspects of the invention relate to apparatuses for practicing the process. Other aspects of the invention relate to kits for practicing the process and operating the apparatuses. In some embodiments, kits include an apparatus and instructions for operating the apparatus.

Aspects of the invention relate to pyrolysis processes for converting solid biomass to a bio-oil or gas in the presence of catalysts. In general, pyrolysis of biomass material can be carried out thermally, in the absence of a catalyst or in presence of a catalyst. Pyrolysis processes produce gaseous products ($CO_2$, $CO$, $CH_4$, $H_2$ and $C_2H_4$), liquid products (pyrolysis oil or bio-oil) a solid product (coke, char and ash). Pyrolysis processes can be modified as to produce less char and coke and more valuable products such as liquid products or valuable gas products. The bio-oil may be converted to suitable liquid transportation fuels in modified refinery processes such as fluid catalytic cracking, hydroconversion, thermal conversion, and the like. In these processes, the bio-oil may be the sole feedstock, or it may be blended with conventional, crude oil-based feedstocks. Examples of valuable liquid products include fuel such as jet fuels, diesel, and heating oil. Example of valuable gas include ethane, propane, and butane.

In some aspects of the invention, the process includes preparing solid biomass for catalytic conversion, which can improve conversion of the biomass into fuels. In some embodiments, the process includes pre-treating the biomass prior to interacting the biomass with the catalyst. In some embodiments, the biomass is subjected to a pre-treatment such as torrefaction, swelling of the biomass, impregnation, precipitation, adsorption, co-milling, steam explosion, etc. For example, pre-treating can include biomass size reduction to generate particulate biomass.

In general, increasing the liquid yield of biomass pyrolysis processes required fast heating rate, a short reaction time and a rapid quench of the liquid reaction products. Fluidized bed reactors with fast heating rates have been proposed for biomass pyrolysis processes. In some case, heat is provided by injecting hot particulate heat transfer medium (e.g., char, sand) particles into the reactor.

Aspects of the invention relate to treating the biomass with a catalyst. In some embodiments, the use of suitable catalysts leads to an increase of the yield of organic compounds usable as a fuel, feedstock, specialty chemical and a reduction of the yield of undesirable products such as coke, tar and unconverted biomass.

As used herein, the term "catalyst" refers to any material that facilitates the conversion of organic components of the biomass into bio-oils, fuels, specialty chemicals or precursors thereof. Phyllosilicate minerals, in particular clay, form a particularly attractive class of catalyst precursor materials because of their physicochemical properties which are the result of large cation exchange capacity, large surface area that is chemically active, layered structures forming interstitial spaces and interaction with organic and inorganic liquids. Clay minerals can catalyze reactions on their surface and interstitial or intralamellar space. In some embodiments, the catalyst is a clay or a modified clay. Suitable clay materials include cationic and anionic clays, for example smectite, bentonite, sepiolite, atapulgite, hydrotalcite and the like. Suitable hydrotalcites include mixed metal oxides and hydroxides having a hydrotalcite structure and metal hydroxyl salts. Preferred clay materials include smectite clays. Smectite clays include montmorillonite (MO), beidellite, saponite, bentonite and mixture thereof. Smectites clays have a chemical composition comprising tetravalent element (Si), trivalent element (Al and/or Fe), O and H. As an example, the formula of smectite clay is $Al_2O_3 4SiO_2 H_2O$, Smectite clays have a variable net negative charge which is balanced by divalent cations, e.g., Ca, Mg and/or monovalent cations e.g., Na, Li and/or H. For example, there are different types of bentonites and their names depend on the dominant elements, such as potassium (K), sodium (Na), calcium (Ca), magnesium (Mg), calcium-magnesium (Ca—Mg) and aluminum (Al).

The structure, chemical composition, exchangeable ion type and small crystal size of smectite and bentonite clays are responsible for several unique properties, including a large chemically active surface area, a high cation exchange capacity, and interlamellar surfaces. Where Na is the predominant exchangeable ion, smectite clays may have a high swelling capacity (referred herein as "swelling" clays). In contrast, where Ca and Mg are the predominant exchangeable ions, smectite clays have only a small degree of swelling (referred herein as "non-swelling" clays).

In some embodiments, clays (referred herein as clay catalyst precursors) are pre-treated, modified or restructured before being used as a catalyst. Pre-treatment may include drying, extraction, washing, subjecting to ion-exchange, calcining or a combination thereof. In preferred embodiments, the clay catalyst precursor are modified to produce a catalyst with higher selectivity and/or efficiency. In exemplary embodiments, the clay catalyst precursors are modified by incorporating different metal cations or molecules to produce a catalyst with higher selectivity and/or efficiency.

Clays have ion exchange capacity and therefore provide a useful class of materials that contain metal ions that can be exchanged with suitable metal ions that exhibit catalytic activity and selectivity for converting the nascent produced bio oil to lighter organic compounds containing a smaller amount of oxygen. The exchangeable ions associated with smectite clays are easily and reversibly replaceable. For example, calcium bentonite can adsorb ions in solution and therefore may be converted to an exchanged form of bentonite using a ion exchange process.

Some aspects of the invention relate to a process of producing a biomass catalytic cracking catalyst having an improved yield in a pyrolysis reaction. In some embodiments, the process comprises the steps of (a) treating a phyllosilicate material with an acidic solutions or base solutions to obtain a leached phyllosilicate preparation; (b) contacting the leached phyllosilicate preparation with a suspension comprising metal ions, (c) calcining the leached phyllosilicate preparation, before or after contacting the leached phyllosilicate with a metal ions suspension, thereby forming a modified phyllosilicate, (d) optionally mixing the modified phyllosilicate with inorganic materials; and (e) forming fluidizable microspheres.

Calcination

In some embodiments, the clay catalyst precursors or modified clays are subjected to a calcining or calcination treatment. Calcination is a thermal treatment process which usually takes place at temperatures below the melting point of the product materials, also referred herein as calcine. In general, calcination leads to the decomposition of hydrated minerals to remove at least part of the water as water vapor as well as to effect phase transformations, or drive off carbon dioxide in carbonate materials. Calcining generally involves heating the material, for a short period of time (e.g., flash calcination) or for several hours or days. It may be carried out in air or in special atmosphere such as steam, nitrogen or a noble gas.

Calcining can be used to remove water and create pores structure. Calcination can be carried out at temperatures of at least about 400° C., at least about 500° C., at least about 600° C. Mild calcination at temperature less than about 600° C. may result in material that is rehydratable. In some embodiments, the clay is subjected to temperatures of at least about 600° C., to convert the clay into a calcined clay form that is not re-hydratable. In some embodiments, calcination converts clay materials into a rehydratable mixed metal oxide (solid solution) or, at higher temperatures, into a spinel-type oxide. As used herein, the term "mixed oxide" refers to chemical compound formed from at least two oxides of different metals. As used herein, the term "spinel" refers to minerals having the general formula $A^{2+}B_2^{3+}O_4^{2-}$ wherein A and B can be divalent, trivalent, tetravalent ions. In some embodiments, the dehydrated product that retains the memory of the hydrated form can be rehydrated to form the original structure.

Calcination at very high temperatures may result in chemical and/or morphological modifications of the material being calcinated. Calcination processes aiming at chemical and/or morphological modifications of the material being calcinated require high calcination temperatures, for example at least about 700° C., at least about 800° C., or at least about 900° C., at least about 1000° C., at least about 1100° C., or at least about 1200° C. Calcination at high temperatures allows, for example, divalent metal ions to be transformed to its oxide or to react with, for example, alumina to form a mixed metal oxide (MMO). In an exemplary embodiment, under calcination at high temperatures, metal carbonates may be converted to metal oxides (MO) or mixed metal oxides, and mixed metal oxides (MMO) may be converted to a spinel phase.

Upon calcination of the ion-exchanged class of materials, the modified clay will produce the respective metal oxide forms within the clay substrates. Calcination at much higher temperature causes the metal to react with the alumina present in the clay structure to form the kind of $XY_2O_4$ spinels and mixed metal oxide (MMO) phases. In some embodiments, mixed metal oxides and spinels having the formula $MgAl_2O_4$, $CaAl_2O_4$ and/or $(Mg—Ca)Al_2O_4$ are formed.

Ion Exchange

Aspects of the invention relate to a process to produce clay based modified catalyst substrates. In some embodiments, the process generally comprises the step of subjecting the clay to ion-exchange. In some embodiments, the ion-exchanged clays are modified by incorporating different divalent or trivalent metal cations. Suitable divalent cations include $Ni^{2+}$, $Co^{2+}$, $Cu^{2+}$, $Cd^{2+}$, $Ca^{2+}$, $Zn^{2+}$, $Mg^{2+}$, $Fe^{2+}$, $Ba^{2+}$, $Sr^{2+}$ and $Mn^{2+}$, wherein $Ca^{2+}$, $Mg^{2+}$ and $Zn^{2+}$, are the most preferred. Examples of divalent metal compounds are inorganic salts (e.g., chloride, nitrate, or sulfate), organic salts (e.g., formate, acetate), oxides, hydroxides, carbonates, and hydroxy-carbonates of the divalent metal. Preferred divalent metal compounds do not leave undesired anions in the resulting compositions.

In some embodiments, non-swelling bentonite clays, such as calcium bentonite clays, are modified by ion-exchange to a calcium or magnesium bentonite clay. In some embodiments, enriched calcium-containing clay is formed by ion-exchange of the magnesium ions $Mg^{2+}$ with calcium ions $Ca^{2+}$. For example, ion exchange can be performed using calcium salts such as $Ca(NO_3)_2$. In some embodiments, the sodium bentonites (swelling bentonites) are ion exchanged with divalent and trivalent cations. Preferred ions are Ca, Mg, Zn, Ce or La. In other embodiments, the calcium bentonite clay is subjected to ion-exchange with a magnesium salt to produce clay containing predominantly magnesium ions $Mg^{2+}$.

Clay Based Modified Catalyst Substrates

Smectites clays are highly acidic as they contain $AlO_4$ and $SiO_4$. In some embodiments, it can be advantageous to remove alumina and/or silica from the clay framework. According to some embodiments, the smectite clay is modified by acid treatment to remove at least part of the alumina content. In some embodiments, the alumina content of the modified catalyst is between 5 weight percent and 90 weight percent, between 10 weight percent and 80 weight percent, or between 20 weight percent and 40 weight percent. The acid, for acid treatment, can be selected from the group comprising sulfuric acid, nitric acid, hydrochloride acid, acetic acid, oxalic acid, and formic acid in aqueous solution. The acid treatment is conducted for about 30 min., about 1 h, about 2 h, about 5 h, about 10 h, about 24 h at temperatures of about 20° C., about 30° C., about 40° C., about 60° C., about 100° C., about 150° C., about 200° C. or about 250° C.

After the acid treatment of the clay, the soluble alumina salts can be precipitated on the clay particles by the addition of the magnesium base or calcium base or a mixture thereof. In some embodiments, the soluble alumina salts are precipitated with metal hydroxides, carbonates, oxides, hydroxides or hydroxyl carbonates. In some embodiments, upon acid treatment, aluminium salts (or sodium aluminate) are formed and removed. The aluminium can be used to react with magnesium or calcium to form mixed metal hydroxides which can be calcined to form mixed metal oxides and spinels. The soluble alumina can be further used to form catalytic active compositions such as sodium aluminate or sodium hydroxyl aluminum carbonate such as $[Na AlCO_3(OH)_2]$.

In some embodiments, the acid treated clay or leached clay can be modified by ion exchange with Transition Metals such as, for example, Zn, Ni, Co, Fe, Cu, etc., or with Rare Earth ions such as, for example, Ce or La.

In some aspects of the invention, the clays are leached with a base to remove some silica from the clay crystal framework. After the soluble silica salts are removed from the clay by filtration and washing, the base-leached clay can be ion-exchanged with metal ions selected from the Alkaline Earth, Transition and Rare Earth groups.

In some embodiments, the leached and ion-exchanged clays are calcined and/or steamed at higher temperatures in order to reduce the sodium aluminate and porosity, and if so desired, to reduce the catalytic activity when used in catalytic pyrolysis and where lesser activity is required.

After the leaching treatment of the clay, the soluble silica salts can be precipitated on the clay particles by the addition of the magnesium base or calcium base or a mixture thereof. In some embodiments, the leached silica in solution can be precipitated on the clay by adding a basic form of calcium or magnesium to form calcium or magnesium silicate. In some embodiments, the leached clay can be ion-exchanged with Transition Metals such as, for example, Zn, Ni, Co, Fe, Cu, etc., or with Rare Earth ions such as, for example, Ce or La.

Compositions Comprising Said Modified Clays and Other Catalytically Active Materials In some aspects of the invention, clay or modified clays (e.g., leached and/or ion-exchanged clays) are mixed with catalytically active metals, metal salts, metal oxides, hydroxides, hydroxyl carbonates, phosphates, and the like. In some embodiments, clay or modified clay is mixed with about 5 weight percent, about 10 weight percent, about 20 weight percent or more of one or more mixed oxides. For example, clay or modified clay can be mixed with MgO. CaO, ZnO, CeO, $Al_2O_3$ and mixtures thereof.

In some embodiments, clays and modified clays are compounded into shaped bodies such as microspheres. For example, modified clays are compounded into microspheres by spray drying. In some embodiments, the leached and ion-exchanged clays can be mixed with other clays, serving as diluents, extenders, substrates, etc., and spray dried without or with binders. In some embodiments, a dispersing agent can be added to the slurry mixture. For example, the dispersing agent can be tetrasodium pyrophosphate. The binders can be selected from the group of sodium silicate, silica, silica-alumina, alumina, phosphate, peptized alumina, binding clays and combinations thereof. In some embodiments, the binder comprises phosphates. In some embodiments, sodium bentonites or ion-exchanged forms thereof are used as binders. In some embodiments, the content of the binder is about 3 weight percent, about 5 weight percent, about 7 weight percent, or about 10 weight percent.

In some embodiments, the microspheres have an average particle diameter that is suitable for commercial fluid cracking catalysts. In an exemplary embodiments, the microspheres have an average size of about 50 μm, about 60 μm, about 70 μm, about 80 μm, about 90 μm or about 100 μm.

In some embodiments, clays and modified clays are mixed with zeolites to form clays-zeolites composites (e.g., leached clay-zeolite composite). Clay-zeolite composites are alumino minerals having a porous structure capable to accommodate a wide variety of cations, e.g., $Na^+$, $K^+$, $Ca^{2+}$, $Mg^{2+}$ and others, which are generally usually loosely held and can be exchanged for other cations. Zeolites are desirable catalysts due to the high concentration of active acid sites, their high thermal/hydrothermal stability, and high size selectivity. In some embodiments, clays or modified clays are mixed with zeolites. In some embodiments, the zeolites can be selected from the group of small-pore type zeolites such as, ZSM-like zeolite, Mordenite Framework Inverted (MFI) zeolites, modified MFI zeolites, phosphated MFI zeolites, ion exchanged forms thereof, such as H-ZSM, Zn-ZSM, Mg-ZSM, and the like, Faujsasite-type zeolites, such as a Zeolite Y, a USY zeolite, a REUSY zeolite, a DAY zeolite or NaY zeolite and any combinations of the foregoing. In other embodiments, clays or modified clays are mixed with large-pore zeolites of the Faujasite type (i.e., NaY), USY's, DAY's and metal exchanged forms thereof, like CeY, CaY, MgY, with Rare Earth metals (La, Ce) and the like. Yet in other embodiments, clays or modified clays are mixed with other kinds of zeolites such as mordenites, Type A, clinoptolilite, chabazite, as such or their metal ion exchanged form. In some embodiments large pores are defined as pores having diameters of about 600 to about 20,000 Angstrom, small pore size are defined as pores having a diameter less than about 100 Angstrom.

In some embodiments, clays and modified clays are mixed and compounded into shaped bodies with synthetic clays. Synthetic clays may be anionic or cationic type, such as, for example layered-double metal hydroxides (i.e., hydrotalcite and hydrotalcite type), and saponites.

In some embodiments, clays and modified clays are mixed and compounded into shaped bodies with other minerals, ores, waste side products from the steel and cement industries, etc. These by-products include spent FCC, Equilibrium FCC/E-CAT or HPC catalysts, fly ash, cement flint, etc.

Exfoliated Clays

In some aspects of the invention, synthetic clays containing organic anions such as acetates, are calcined at moderate temperatures, such as between about 400° C. and about 800° C., thereby decomposing to form mesoporous solid-solutions, with large surface areas and pore volume. The dehydrated material can retain the memory of the layered structure as hydration reconstitutes the original structure (i.e., memory behavior). In some embodiments, the dehydrated product, that retains the memory of the hydrated form, can be rehydrated to form the original structure. In some embodiments, during the rehydration, other metals (for example metal salts) are substituted in and can be included in the newly recrystallized structure.

In some embodiments, the rehydrated product is subjected to calcination at temperature of about 800° C., about 900° C., about 1000° C., resulting in the formation of metal oxide, metal-mixed oxide solid solutions and/or spinel phases.

Delaminated Clays

In some aspects of the invention, ordered layered sheet-like clay can be disordered by applying a high shear mechanical action to the clay in a dry or slurry form. Preferred clays include the kaolinite clay which is a silicate mineral. Delamination can be applied to raw ordered layered sheet-like clay or leached ordered layered sheet-like clay. Delamination includes the use of soft media grinding and/or hard grinding media. For example, hard grinding media include sand, glass, alumina, and zirconia. The soft grinding media may be plastic, such as nylon or styrene. In some embodiments, the aqueous slurry of kaolinite is subjected to grinding media under agitation.

In some embodiments, the delaminated clay is calcined to produce materials with higher mesoporous and macroporous structure. For example, the delaminated clay is heated at temperatures of about 900° C., about 1000° C., about 1100° C. for about 4 hours. Mesoporous structures contain pores with diameters between 2 nm and 50 nm while macroporous structures have pore diameters greater than 50 nm. In some embodiments, the delaminated clays can be acid leached to remove at least part of its alumina content. The acid can be selected from the group of nitric acid, hydrochloric acid, sulphuric acid, acetic acid, oxalic acid and formic acid. In other embodiments, the delaminated clays can be base leached to remove at least part of its silica content.

In some embodiments, catalytic active metal compounds can be incorporated in modified clay i.e., the delaminated, calcined-delaminated, leached-delaminated, or leached-delaminated-calcined materials. In some embodiments, metal oxides, metal hydroxides, metal ions are applied by impregnation or precipitation on delaminated, calcined-delaminated, leached-delaminated, and leached-delaminated-calcined materials. The modified clay can then be mixed with other clays, zeolites, and other inorganic compounds and materials to be used as catalysts, for the thermoconversion of biomass to fuels. In some embodiments, the modified clay can be used as a catalyst, a heat carrier or both a catalyst and heat carrier in the conversion process.

EXAMPLES

The catalysts described in FIGS. 1 and 2 (Reference kaolinite catalyst and Examples 1-6) were prepared as follows:

A series of catalysts was prepared using sodium silicate as the silica source binder along with 30% metal oxide or mixtures of metal oxides and kaolinite clay as the balance of the formulation. Slurries were prepared by mixing sodium silicate (5 wt % $SiO_2$) with kaolinite clay and dispersing agent (0.3 wt % tetrasodium pyrophosphate based on the weight of kaolinite). To this slurry, a metal oxide or mixtures of oxides thereof (20 wt %) was added. The resulting slurry (40% solids) was spray dried to produce microspheres with an average particle size of 70 to 80 microns. The metal oxides used to prepare these samples were aluminum oxide (Catapal), magnesium oxide (MgO), calcium oxide (CaO) and zinc oxide (ZnO) or mixtures thereof.

A reference catalyst was prepared as described above, but without the metal oxides. A second reference catalyst, a commercial microspherical catalyst, was included in the study.

These catalysts were calcined at 1000° F. prior to catalytic testing. The catalysts were evaluated in a circulating fluid reactor of a pilot scale unit that was modified for biomass pyrolysis (see for example, Energy & Fuels, 14 (2000) 1161-1167 and Ind. Eng. Chem. Res, 47 (2008) 742-747).

The quality of the bio-oil produced in this circulating fluid bed reactor is reported in FIG. 2. In general, the introduction of these metal oxides into the sodium silicate/kaolinite catalyst system reduces the oxygen content in the resulting oil at constant oil yield compared to the kaolinite reference catalyst.

The present invention provides, among other things, clay-based compositions for use in catalytic pyrolysis or gasification of biomass. While specific embodiments of the subject invention have been discussed, the above specification is illustrative and not restrictive. Many variations of the invention will be come apparent to those skilled in the art upon review of this specification. The full scope of the invention should be determined by reference to the claims, along with their full scope of equivalents, and the specification, along with such variations.

The invention claimed is:

1. A biomass catalytic cracking catalyst produced by the steps comprising:
    a. modifying a phyllosilicate to produce a modified phyllosilicate having an improved yield when used in a biomass pyrolysis reaction, wherein the step of modifying comprises:
        i. leaching the phyllosilicate to form a leached phyllosilicate preparation;
        ii. calcining the leached phyllosilicate preparation forming a treated phyllosilicate;
        iii. contacting the treated phyllosilicate with a suspension comprising metal ions forming a modified phyllosilicate;
    b. mixing the modified phyllosilicate with inorganic materials forming a mixture wherein the inorganic materials are selected from the group consisting of metal oxides, synthetic clays, equilibrium cracking catalysts, fly ash, and cement flint; and
    c. shaping the mixture into fluidizable microspheres, wherein the catalyst comprises spinels, mixed metal oxide or a combination thereof.

2. A process to produce a biomass catalytic cracking catalyst consisting of:
    a. modifying a phyllosilicate to produce a modified phyllosilicate having an improved yield when used in a pyrolysis reaction, wherein the step of modifying comprises:
        (i) leaching the phyllosilicate to form a leached phyllosilicate preparation;
        (ii) calcining the leached phyllosilicate preparation forming a treated phyllosilicate;
        (iii) contacting the treated phyllosilicate with a suspension comprising metal ions forming a modified phyllosilicate;
    b. mixing the modified phyllosilicate with inorganic materials forming a mixture wherein the inorganic materials are selected from the group consisting of metal oxides, synthetic clays, equilibrium cracking catalysts, fly ash, and cement flint; and
    c. shaping the mixture into fluidizable microspheres.

3. The process of claim 2 wherein the leaching of the phyllosilicate in step (i) includes treating with an acid to remove at least part of its alumina content thereby forming an acid leached phyllosilicate preparation or treating with a base to remove at least part of its silica content thereby forming a base leached phyllosilicate preparation.

4. The process of claim 2 wherein the phyllosilicate is selected from the group consisting of smectite, bentonite, montmorillonite, beidellite, kaolinite and mixtures thereof.

5. The process of claim 4 wherein the smectite is a non-swelling smectite.

6. The process of claim 2 wherein the metal ions are selected from the group of trivalent cations, divalent cations, monovalent cations, and combination thereof.

7. The process of claim 6 wherein
    the trivalent cations are selected from the group of Al, Ga, Bi, Fe, Cr, Co, Sc, La, Ce and combinations thereof,
    the divalent cations are selected from the group of Mg, Ca, Zn, Ba, Mn, Co, Mo, Ni, Cu and Sr and combinations thereof, and
    the monovalent cations are selected from the group of Na and K.

8. The process of claim 2 wherein the phyllosilicate is delaminated prior to the leaching step (i).

9. The process of claim 2 wherein the resulting catalyst is a mixed metal oxide or spinel.

10. The process of claim 2 wherein the step of calcining comprises heating the phyllosilicate at a temperature between about 200° C. and about 1000° C.

11. The process of claim 2 wherein the step of modifying further comprises rehydrating the treated phyllosilicate prior to contacting with the suspension.

12. The process of claim 2 wherein the step of shaping comprises spray drying the mixture to form microsphere particles suitable for biomass catalytic cracking.

13. The process of claim 12 wherein the microspheres are prepared in the presence of binders.

14. The process of claim 13 wherein the binder is selected from the group of sodium silicate, silica, silica-alumina, alumina and phosphate.

15. The process of claim 13 wherein the binder comprises phosphates.

16. The process of claim 2 wherein the phyllosilicate is kaolinite and the step of modifying further comprises delaminating the kaolinite.

17. The process of claim 2 wherein the catalyst has a reduced coke yield when used in biomass pyrolysis.

18. The process of claim 2 wherein the catalyst has a reduced oxygenated product yield when used in biomass pyrolysis.

19. The process of claim 2 wherein the catalyst has an improved bio-oil yield when used in biomass pyrolysis.

20. The process of claim 2 wherein in the step of mixing the inorganic material is a metal oxide selected from the group consisting of MgO, CaO, ZnO, CeO, $Al_2O_3$ or a mixture thereof.

* * * * *